United States Patent
Li et al.

(10) Patent No.: US 11,079,174 B2
(45) Date of Patent: Aug. 3, 2021

(54) METHOD FOR DETECTING WHETHER ARTICLE WITH ABNORMAL TEMPERATURE IS PLACED IN REFRIGERATOR

(71) Applicant: QINGDAO HAIER JOINT STOCK CO., LTD., Qingdao (CN)

(72) Inventors: Chunyang Li, Qingdao (CN); Ming Wang, Qingdao (CN); Jianlin Miao, Qingdao (CN); Sen Mou, Qingdao (CN); Bintang Zhao, Qingdao (CN)

(73) Assignee: QINGDAO HAIER JOINT STOCK CO., LTD., Qingdao (CN)

( * ) Notice: Subject to any disclaimer, the term of this patent is extended or adjusted under 35 U.S.C. 154(b) by 215 days.

(21) Appl. No.: 16/463,839

(22) PCT Filed: Nov. 22, 2017

(86) PCT No.: PCT/CN2017/112413
§ 371 (c)(1),
(2) Date: May 23, 2019

(87) PCT Pub. No.: WO2018/095339
PCT Pub. Date: May 31, 2018

(65) Prior Publication Data
US 2019/0331410 A1    Oct. 31, 2019

(30) Foreign Application Priority Data

Nov. 23, 2016   (CN) .......................... 201611046859.1

(51) Int. Cl.
F25D 29/00    (2006.01)

(52) U.S. Cl.
CPC ......... *F25D 29/005* (2013.01); *F25D 29/008* (2013.01); *F25D 2700/06* (2013.01); *F25D 2700/16* (2013.01)

(58) Field of Classification Search
CPC .... F25D 29/005; F25D 29/008; F25D 29/003; F25D 2700/06; F25D 2700/16;
(Continued)

(56) References Cited

U.S. PATENT DOCUMENTS

2004/0031275 A1* 2/2004 Cho ..................... F25D 17/045
62/179
2004/0050075 A1* 3/2004 King ..................... F25D 29/00
62/131
(Continued)

FOREIGN PATENT DOCUMENTS

CN        1475734 A       2/2004
CN      102878773 A       1/2013
(Continued)

*Primary Examiner* — Kun Kai Ma
(74) *Attorney, Agent, or Firm* — Cheng-Ju Chiang (57) ABSTRACT

A method for detecting whether an article with an abnormal temperature is placed in a refrigerator. The method includes: controlling a plurality of infrared sensors to collect temperature values after a door body is opened; determining whether an abnormal storage space in which the article with the abnormal temperature is possibly placed exists in a plurality of storage spaces; acquiring a first temperature change value of the abnormal storage space between time points before and after the article with the abnormal temperature is possibly placed in the abnormal storage space and a second temperature change value of the abnormal storage space caused by heat exchange between an external environment and the abnormal storage space between said time points; and determining whether the article with the abnormal temperature is placed in the abnormal storage space according to the first temperature change value and the second temperature change value.

9 Claims, 6 Drawing Sheets

(58) Field of Classification Search
CPC ............ F25D 2700/123; F25D 2500/04; G01J 5/0003; G01J 5/026
See application file for complete search history.

(56) References Cited

U.S. PATENT DOCUMENTS

| | | | |
|---|---|---|---|
| 2007/0125104 A1* | 6/2007 | Ehlers | G07F 9/105 62/157 |
| 2012/0017630 A1* | 1/2012 | Okabe | F25D 17/042 62/407 |
| 2015/0153087 A1* | 6/2015 | Yamashita | A47B 81/00 62/457.2 |
| 2015/0260450 A1* | 9/2015 | Marutani | G08B 21/02 62/131 |
| 2016/0265833 A1* | 9/2016 | Yoon | F25D 29/00 |
| 2018/0156518 A1* | 6/2018 | Li | F25D 29/005 |
| 2018/0173254 A1* | 6/2018 | Li | F25D 17/065 |
| 2019/0331410 A1* | 10/2019 | Li | F25D 29/008 |

FOREIGN PATENT DOCUMENTS

| | | |
|---|---|---|
| CN | 104296490 A | 1/2015 |
| CN | 104990326 A | 10/2015 |
| CN | 105698479 A | 6/2016 |
| CN | 106766646 A | 5/2017 |
| CN | 106766647 A | 5/2017 |
| CN | 106766650 A | 5/2017 |
| JP | 2005-328859 A | 12/2005 |
| JP | 2010-35484 A | 2/2010 |
| KR | 1999-0039264 A | 6/1999 |
| KR | 10-0244342 B1 | 3/2000 |
| KR | 10-1659937 B1 | 9/2016 |

\* cited by examiner

METHOD FOR DETECTING WHETHER ARTICLE WITH ABNORMAL TEMPERATURE IS PLACED IN REFRIGERATOR

The present application is a 35 U.S.C. § 371 National Phase conversion of International (PCT) Patent Application No. PCT/CN2017/112413, filed on Nov. 22, 2017, which claims the priority of the Chinese patent application No. 201611046859.1 filed on Nov. 23, 2016 and with the title of "Method for Detecting Whether Article with Abnormal Temperature Is Placed in Refrigerator", which is incorporated herein in its entirety by reference. The PCT International Patent Application was filed and published in Chinese.

TECHNICAL FIELD

The present invention relates to refrigerating and freezing equipment, and more particularly, to a method for detecting whether an article with an abnormal temperature is placed in a refrigerator.

BACKGROUND

A conventional refrigerator generally uses a temperature sensor arranged inside a storage compartment to sense a temperature around the temperature sensor, and takes the temperature as a basis for refrigeration control. When this control approach is used in refrigerator control, the refrigerator starts a refrigeration mode once the temperature measured by the temperature sensor is higher than a preset value. However, in a case where the storage compartment is divided into a plurality of relatively independent storage spaces by shelf partitions, if a user puts hot food with a higher temperature into a certain storage space of the refrigerator, on one hand, a temperature of this storage space is increased because of the hot food, so that various bacteria that originally exist in food inside the refrigerator grow faster, which is not conducive to healthy and safe preservation of the food. On the other hand, if the whole storage compartment is refrigerated in the same way, not only is electric energy wasted, but also the temperature reduction of the storage space with the hot food slows down.

In addition, after a refrigerator door is opened, the temperature of the storage space will be changed because of the hot food; and moreover, the temperature of a storage space without the hot food will be changed because of the heat exchange caused by the natural convection between the external environment and the storage compartment. But in the prior art, there is no proper discriminating method to distinguish the above two cases, resulting in poor refrigeration control accuracy of the conventional refrigerator. Thus, it is always eager to solve the existing technical problem in the refrigerator technology field to provide a method capable of distinguishing the above two cases more accurately without excessively increasing the hardware cost of the refrigerator.

SUMMARY

With respect to the above problems, the present invention aims to overcome the above defects or at least partially solve the above problems.

A further object of the present invention is to provide a method for detecting whether an article with an abnormal temperature is placed in a refrigerator so as to detect whether overheated food is placed in the refrigerator during opening of a refrigerator door.

Another further object of the present invention is to improve the refrigeration control accuracy of the refrigerator.

Particularly, the present invention provides a method for detecting whether an article with an abnormal temperature is placed in a refrigerator, wherein the refrigerator includes a refrigerator body whose inner portion is divided into a plurality of storage spaces, a door body arranged at the front of the refrigerator body, and a plurality of infrared sensors configured to sense temperatures of the plurality of storage spaces respectively. The method includes:

controlling the plurality of infrared sensors to collect temperature values after the door body is opened;

determining whether an abnormal storage space in which an article with an abnormal temperature is possibly placed exists in the plurality of storage spaces;

acquiring a first temperature change value of the abnormal storage space before and after the article with the abnormal temperature is possibly placed in the abnormal storage space if it is determined that the abnormal storage space exists;

calculating a second temperature change value of the abnormal storage space according to a temperature difference summation formula sum(n)=sum(n−1)+IR(n+1)−IR(n), the second temperature change value is caused by heat exchange between an external environment and the abnormal storage space between time points before and after the article with the abnormal temperature is possibly placed in the abnormal storage space, wherein at the start of the temperature difference summation calculation, sum(0)=0, and if an absolute value of a difference of temperature values collected by an infrared sensor corresponding to the abnormal storage space at the (n+1)-th time and the n-th time between time points before and after the article with the abnormal temperature is possibly placed in the abnormal storage space is smaller than a first preset value, IR(n+1) and IR(n) are respectively the temperature values collected by the infrared sensor corresponding to the abnormal storage space at the (n+1)-th time and the n-th time between time points before and after the article with the abnormal temperature is possibly placed in the abnormal storage space, or if the absolute value of the difference of the temperature values collected by the infrared sensor corresponding to the abnormal storage space at the (n+1)-th time and the n-th time between time points before and after the article with the abnormal temperature is possibly placed in the abnormal storage space is greater than or equal to the first preset value, and there is one additional infrared sensor by which an absolute value of a difference of temperature values collected at the (n+1)-th time and the n-th time between time points before and after the article with the abnormal temperature is possibly placed in the abnormal storage space is smaller than the first preset value, IR(n+1) and IR(n) are respectively temperature values collected by the additional infrared sensor at the (n+1)-th time and the n-th time between time points before and after the article with the abnormal temperature is possibly placed in the abnormal storage space; if there are two or more additional infrared sensors, IR(n+1) and IR(n) are respectively temperature values collected by any one of the additional infrared sensors at the (n+1)-th time and the n-th time between time points before and after the article with the abnormal temperature is possibly placed in the abnormal storage space, or are respectively average values of temperature values collected by the all additional infrared sensors at the (n+1)-th time and the n-th time between time points before and after the article with the abnormal temperature is possibly placed in the abnormal storage space; and if an absolute value of a difference of temperature values collected by each of the infrared sensors at the (n+1)-th time and the n-th time between time points before and after the article with the abnormal temperature is possibly placed in the abnormal storage space is greater than or equal to the first preset value, sum(n)=sum(n−1); and determining whether the article with the abnormal temperature is placed in the abnormal storage space according to the first temperature change value and the second temperature change value.

Optionally, determining whether the abnormal storage space exists in the plurality of storage spaces includes:

during opening of the door body, if an absolute value of a difference of temperature values collected by any one of the infrared sensors at two adjacent times is greater than a preset sudden change value, determining that the abnormal storage space exists in the plurality of storage spaces, and determining that each storage space corresponding to an infrared sensor by which an absolute value of a difference of temperature values collected at the two adjacent times is greater than the sudden change value is the abnormal storage space; or during opening of the door body, if an absolute value of a difference of temperature values collected by each of the infrared sensors at two adjacent times is smaller than or equal to the sudden change value, determining that the abnormal storage space does not exist in the plurality of storage spaces, wherein the sudden change value is greater than or equal to the first preset value.

Optionally, acquiring the first temperature change value includes:

recording a first temperature value collected by the infrared sensor corresponding to the abnormal storage space for recent E times before the absolute value of the difference of the temperature values collected by the infrared sensor at two adjacent times is greater than the sudden change value, and using the first temperature value as a temperature value of the abnormal storage space before the article with the abnormal temperature is possibly placed in the abnormal storage space, wherein E≥2;

recording a second temperature value collected by the infrared sensor corresponding to the abnormal storage space at any one of continuous M times after the absolute value of the difference of the temperature values collected by the infrared sensor corresponding to the abnormal temperature space at two adjacent times is greater than the sudden change value and the absolute value of the difference of the temperature values collected at any two adjacent times in the continuous M times is smaller than the first preset value, and using the second temperature value as a temperature value of the abnormal storage space after the article with the abnormal temperature is possibly placed in the abnormal storage space, wherein M≥3; and calculating a difference between the second temperature value and the first temperature value, and using the difference as the first temperature change value.

Optionally, the temperature value collected by the infrared sensor corresponding to the abnormal storage space at the first or last time in the continuous M times is recorded as the temperature value of the abnormal storage space after the article with the abnormal temperature is possibly placed in the abnormal storage space.

Optionally, when the infrared sensor corresponding to the abnormal storage space collects the first temperature value, each of the infrared sensors collects temperature for the first time between time points before and after the article with the abnormal temperature is possibly placed in the abnormal storage space.

When the infrared sensor corresponding to the abnormal storage space collects the second temperature value, each of the infrared sensors collects temperature for the last time between time points before and after the article with the abnormal temperature is possibly placed in the abnormal storage space.

Temperature difference summation calculation is performed for the first time by using temperature values collected by the infrared sensor at the second and first times between time points before and after the article with the abnormal temperature is possibly placed in the abnormal storage space.

Temperature difference summation calculation is performed for the last time by using temperature values collected by the infrared sensor at the last two times between time points before and after the article with the abnormal temperature is possibly placed in the abnormal storage space.

A result of the last temperature difference summation calculation serves as the second temperature change value.

Optionally, determining whether the article with the abnormal temperature is placed in the abnormal storage space according to the first temperature change value and the second temperature change value includes:

determining whether a difference between the first temperature change value and the second temperature change value is greater than a second preset value, if yes, determining that the article with the abnormal temperature is placed in the abnormal storage space; or if not, determining that no article with the abnormal temperature is placed in the abnormal storage space, wherein the second preset value is greater than or equal to the sudden change value.

Optionally, the number of the infrared sensors is three or more.

Optionally, controlling the plurality of infrared sensors to collect temperature values is performed after the door body is opened for a preset period.

Optionally, the method further includes:

if it is determined that the article with the abnormal temperature is placed in the abnormal storage space, a visual and/or audible signal is sent to remind a user; and/or if it is determined that the abnormal storage space does not exist, determining that no article with the abnormal temperature is placed in any of the storage spaces during opening of the door body.

In the method for detecting whether the article with the abnormal temperature is placed in the refrigerator provided by the present invention, first, whether the abnormal storage space in which the article with the abnormal temperature is possibly placed exists in the plurality of storage spaces is determined, and then, whether the article with the abnormal temperature is placed in the abnormal storage space is further determined according to the first temperature change value of the abnormal storage space before and after the article with the abnormal temperature is possibly placed in the abnormal storage space and the second temperature change value of the abnormal storage space caused by the heat exchange between the external environment and the abnormal storage space between time points before and after the article with the abnormal temperature is possibly placed in the abnormal storage space. A principle of determining whether the article with the abnormal temperature is placed in the abnormal storage space in the present invention mainly lies in that a temperature change of the storage space caused by hot food put therein and indoor and outdoor heat exchange of the storage space during opening of the refrigerator door is compared with a natural temperature change caused only by indoor and outdoor heat exchange of the storage space during opening of the refrigerator door, so as to determine whether overheated food is placed in this storage space.

At present, there is no method for detecting whether an article with an abnormal temperature is placed in an existing refrigerator. For an ordinary user, he may not be aware of an adverse effect of putting overheated food (food with the temperature above 40° C.) in the refrigerator on the refrigerator or care whether the food in the refrigerator is too hot sometimes. Aiming at these problems, the method provided by the present invention can more accurately determine whether the overheated food is placed in a certain storage space, and the user is reminded when it is determined that the overheated food is placed in the storage space, so that the user will not place the article with the abnormal temperature in the refrigerator for preservation before the temperature of the article tends to be normal. Therefore, the adverse effect of putting the overheated food in the refrigerator on the refrigerator and an article stored therein is avoided or reduced to some extent.

Further, in the present invention, according to the temperature difference summation formula, the second temperature change value of the abnormal storage space caused by the heat exchange between the external environment and the abnormal storage space between time points before and after the article with the abnormal temperature is possibly placed in the abnormal storage space can be more accurately calculated, thereby improving the accuracy of detecting whether the article with the abnormal temperature is placed in the refrigerator.

Further, in the present invention, whether the reason for the temperature rise of the storage space during opening of the refrigerator door is placing food with a higher temperature in the storage space or only is the heat exchange from the natural convection between the external environment and the storage space can be distinguished accurately, so that the refrigerator can control refrigeration more reasonably and appropriately for a specific situation.

The above and other objects, advantages and features of the present invention will be understood by those skilled in the art more clearly with reference to the detailed description of the embodiments of the present invention below with reference to the accompanying drawings.

BRIEF DESCRIPTION OF THE DRAWINGS

The followings will describe some embodiments of the present invention in detail in an exemplary rather than restrictive manner with reference to the accompanying drawings. The same reference signs in the drawings represent the same or similar components or parts. Those skilled in the art shall understand that these drawings may not be necessarily drawn according to the scales. In the drawings.

DETAILED DESCRIPTION

Figure 1:
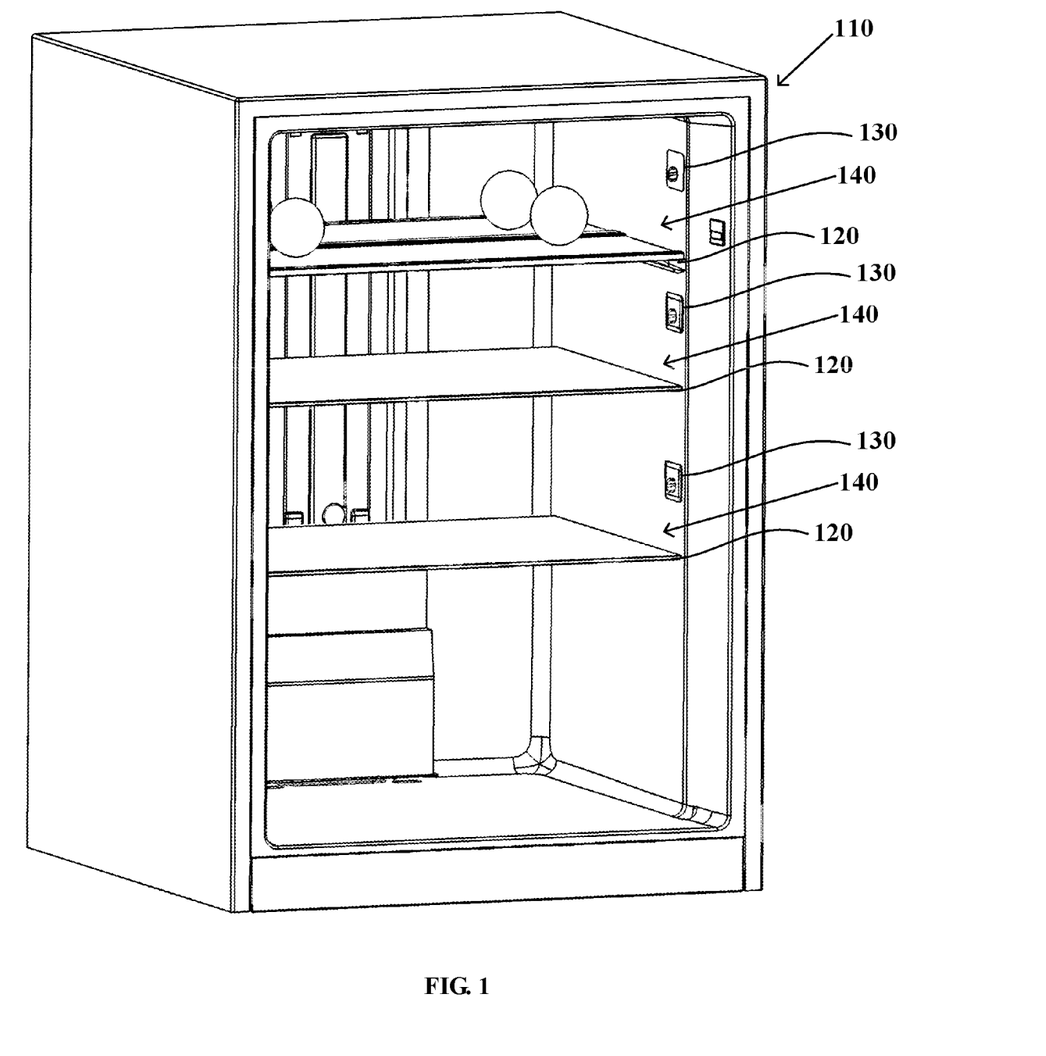
FIG. 1 is a schematically structural view of a refrigerator according to an embodiment of the present invention.

FIG. 1 is a schematically structural view of a refrigerator according to an embodiment of the present invention. Referring to FIG. 1, the refrigerator may generally comprise a refrigerator body 110, a controller disposed on a main control board installed in the refrigerator body 110 and a plurality of infrared sensors 130 respectively electrically connected to the controller. The refrigerator body 110 may be formed by a top wall, a bottom wall, a rear wall, a left side wall and a right side wall in a surrounding manner. A door body (not shown) is arranged at the front of the refrigerator body 110, and is connected to the side walls through a pivotal structure. A storage compartment (for example, a refrigerating chamber) is defined inside the refrigerator body 110, and is divided into a plurality of storage spaces 140. For example, the storage compartment is divided into the plurality of storage spaces 140 through a shelf assembly 120. A preferable structure is that the shelf assembly 120 includes at least one horizontally arranged partition to divide the storage compartment into the plurality of storage spaces 140 in the vertical direction. In FIG. 1, the shelf assembly 120 includes a first partition, a second partition and a third partition, wherein a first storage space is formed above the first partition; a second storage space is formed between the first partition and the second partition; and a third storage space is formed between the second partition and the third partition. In other embodiments of the present invention, the number of the partitions in the shelf assembly 120 and the number of the storage spaces 140 may be preset according to the volume of the refrigerator and use requirements.

The infrared sensors 130 are arranged inside the storage compartment and configured to detect temperatures of respective storage spaces 140, respectively. Each infrared sensor 130 corresponds to one storage space 140, and is configured to detect the temperature in the storage space. The number of infrared sensors 130 is set according to the number of storage spaces 140; and each storage space 140 may be provided with one infrared sensor 130.

In order to improve the temperature sensing accuracy of the infrared sensor 130 to an article in the storage space 140, and satisfy a refrigeration requirement on the storage space 140, the inventor conducted a large number of tests on the installation location of the infrared sensor 130, and obtained the preferred installation location and the preferred configuration of the infrared sensor 130. The infrared sensor 130 in the storage space 140 is located above one-half of the overall height of the storage space 140 (more preferably, located above or at the two-thirds of the overall height of the storage space 140); an angle between an infrared receiving center line of the infrared sensor 130 and the vertical direction ranges from 70° C. to 150° C. (more preferably, from 76° C. to 140° C.); and an angle between a horizontal projection of the infrared receiving center line of the infrared sensor 130 and a side wall where the infrared sensor 130 is located ranges from 30° C. to 60° C. (more preferably, from 30° C. to 45° C.).

The infrared sensor 130 does not emit infrared rays, but passively receives infrared rays emitted by the article in its sensed space and background infrared rays, directly senses a temperature change range and the temperature of the article in the storage space 140, and converts a temperature signal to a corresponding electrical signal.

In the refrigerator of the embodiment of the present invention, the temperature rising result of the storage space 140 can be obtained by calculating two adjacent measurement results of the corresponding infrared sensor 130, so that whether an article with an abnormal temperature is placed in the storage space 140 is determined according to the temperature rise result of the storage space 140. Those skilled in the art will appreciate that the article with the abnormal temperature herein refers to an article with an excessively high temperature (for example, equal to or higher than 40° C.).

In some embodiments of the present invention, the refrigerator is provided with three or more storage spaces 140, and correspondingly, is provided with three or more infrared sensors 130. In the refrigerator, there are at most two storage spaces 140 in which the articles with the abnormal temperature are placed at the same time. In this way, even if the articles with the abnormal temperature are placed in the two storage spaces 140 at the same time, there is/are still storage space(s) 140 without the articles with the abnormal temperature.

Figure 2:
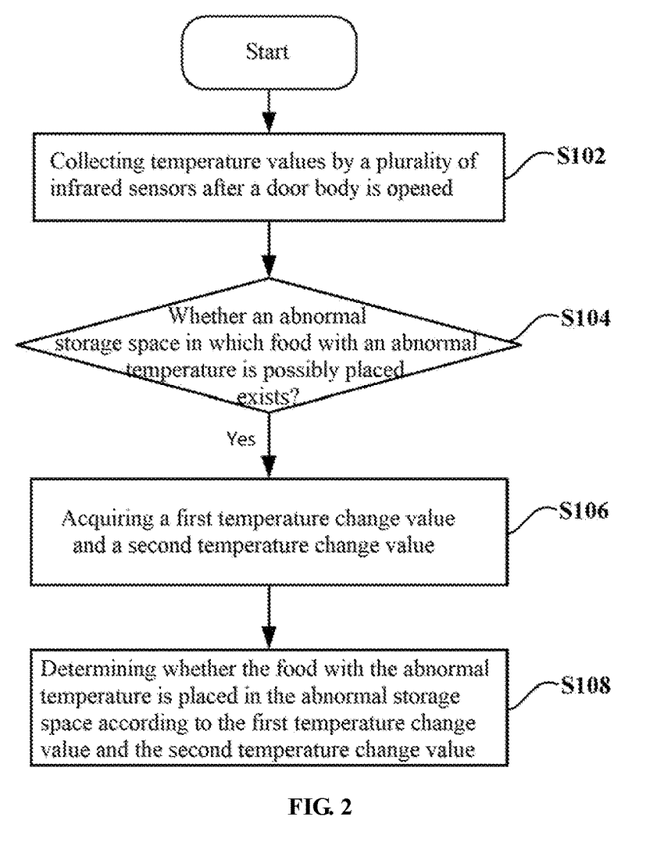
FIG. 2 is a schematic diagram of a method for detecting whether an article with an abnormal temperature is placed in a refrigerator according to an embodiment of the present invention.

FIG. 2 is a schematic diagram of a method for detecting whether an article with an abnormal temperature is placed in a refrigerator according to an embodiment of the present invention. The method for detecting whether the article with the abnormal temperature is placed in the refrigerator may generally include the following steps.

In step S102, a plurality of infrared sensors 130 is controlled to collect temperature values after a door body is opened.

In step S104, whether an abnormal storage space in which the article with the abnormal temperature is possibly placed exists in a plurality of storage spaces 140 according to temperature values collected by each infrared sensor 130 at two adjacent times during opening of the door body.

In step S106, if it is determined that the abnormal storage space exists, a first temperature change value of the abnormal storage space before and after the article with the abnormal temperature is possibly placed in the abnormal storage space and a second temperature change value of the abnormal storage space caused by heat exchange between the external environment and the abnormal storage space between time points before and after the article with the abnormal temperature is possibly placed in the abnormal storage space are acquired.

In step S108, whether the article with the abnormal temperature is placed in the abnormal storage space is determined according to the first temperature change value and the second temperature change value.

In step S102, an opening or closing state of the door body can be detected through a door opening detecting device of the refrigerator. The door opening detecting device can perform detection by using a fan switch, a magnetic sensitive switch, a Hall switch or the like, and generates different electrical signals when the door body is completely closed or opened to indicate the state of the door body. The plurality of infrared sensors 130 is controlled to collect the temperature values after the door is opened for a preset time. The preset time may be, for example, 2 or 3 seconds. Compared with the temperature value collection by the infrared sensor 130 just after the door body is opened, temperature value collection delayed for a preset time avoids a sudden change of the temperature value collected by the infrared sensor 130 due to the airflow disturbance.

The infrared sensor 130 may collect the temperature every 0.1 ms (which can be flexibly adjusted). The plurality of infrared sensors 130 can collect the temperature simultaneously.

There are multiple practicable processes of determining whether the abnormal storage space in which the article with the abnormal temperature is possibly placed exists in the plurality of storage spaces 140 in step S104. One preferred process is described herein by referring to steps S1041 to S1043 shown in FIG. 3.

Figure 3:
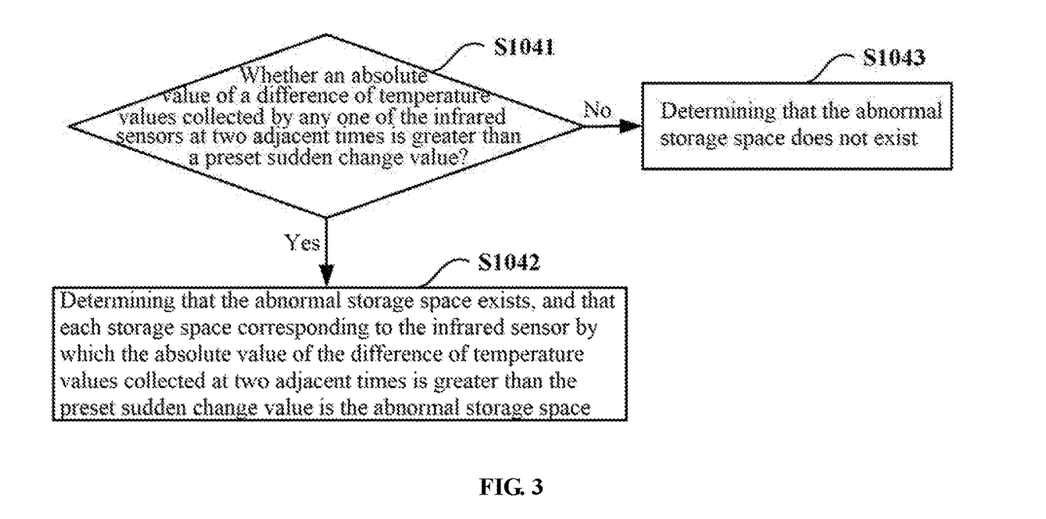
FIG. 3 is a schematic diagram of a method for determining whether an abnormal storage space exists in the refrigerator according to an embodiment of the present invention.

In step S1041, during opening of the door body, whether an absolute value of a difference of temperature values collected by any one of the infrared sensors 130 at two adjacent times is greater than a preset sudden change value is determined; if yes, step S1042 is executed; or if not, step S1043 is executed.

In step S1042, it is determined that the abnormal storage space exists in the plurality of storage spaces 140, and each storage space 140 corresponding to the infrared sensor 130 by which the absolute value of the difference of the temperature values collected at two adjacent times is greater than the preset sudden change value is the abnormal storage space.

In step S1043, it is determined that the abnormal storage space does not exist in the plurality of storage spaces 140.

That is, the process of step S104 preferably includes: during opening of the door body, if an absolute value of a difference of temperature values collected by any one of the infrared sensors 130 at two adjacent times is greater than a sudden change value (that is, the temperature value collected by any of the infrared sensors 130 changes suddenly), it is determined that the abnormal storage space exists in the plurality of storage spaces 140, and each storage space 140 corresponding to the infrared sensor 130 by which the absolute value of the difference of the temperature values collected at two adjacent times is greater than the sudden change value is the abnormal storage space. During opening of the door body, if an absolute value of a difference of temperature values collected by each infrared sensor 130 at two adjacent times is smaller than or equal to the sudden change value, it is determined that the abnormal storage space does not exist in the plurality of storage spaces 140.

In step S1041, the sudden change value can be obtained experimentally. For a particular refrigerator, a difference (may be recorded as a first difference) between temperature values of a storage space 140 caused by the heat exchange between the external environment and the storage space 140 during opening of the door body and detected by the infrared sensor 130 at two adjacent times can be obtained by extensive tests on the refrigerator. As can be appreciated by those skilled in the art, a difference (may be recorded as a second difference) between temperature values of the storage space 140 which is caused by an article with an abnormal temperature placed in the storage space 140 and the heat exchange between the external environment and the storage space 140 during opening of the door body and which is detected by the infrared sensor 130 at two adjacent times should be greater than the first difference described above. For example, during opening of the door body, when an article having a temperature of 25° C. is placed a storage space 140, a difference of temperature values of the storage space 140 detected by the infrared sensor 130 at two adjacent times may serve as a reference value of the sudden change value which may be set to, for example, 0.6° C., 0.7° C., or the like.

In an alternative embodiment, an optional process of step S104 includes: comparing temperatures collected by the plurality of infrared sensors 130 at the same collection number of times, or at the same collection point, or at the same time, and determining that a storage space corresponding to the infrared sensor 130 whose collected temperature is significantly higher than that of another infrared sensor 130 is an abnormal storage space. In another alternative embodiment, an optional process of step S104 includes: manually inputting, by a user, whether an abnormal storage space exists in the plurality of storage spaces 140 and which storage space 140 is an abnormal storage space.

In some embodiments, in step S104, if the abnormal storage space does not exist, it is determined that no article with the abnormal temperature is placed in any of the storage spaces 140 during opening of the door body. That is, during opening of the door body, if there is no infrared sensor 130 by which an absolute value of a difference of the temperature values collected at the two adjacent times is greater than the sudden change value, it is determined that the abnormal storage space does not exist, and it is further determined that no article with the abnormal temperature is placed in any of the storage spaces 140 during opening of the door body.

In step S106, there are multiple practicable processes of acquiring a first temperature change value. One preferred process is described herein by referring to steps S1061 to S1064 shown in FIG. 4.

Figure 4:
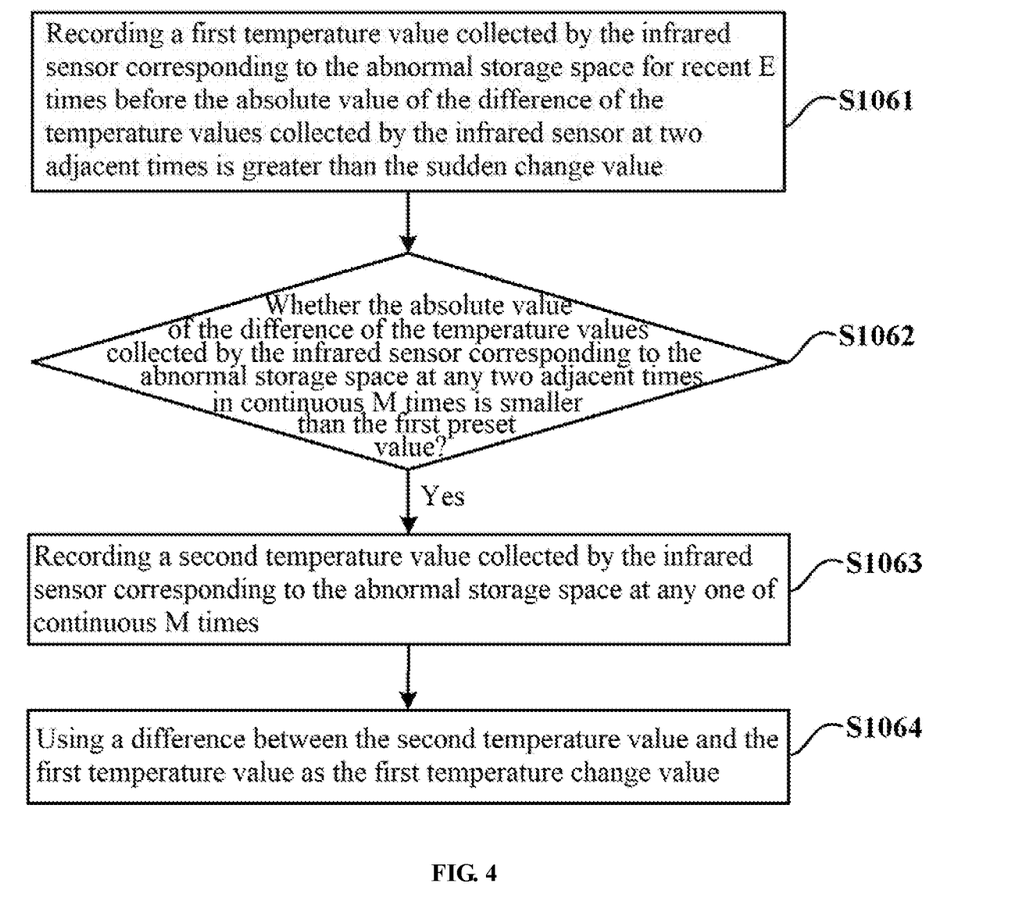
FIG. 4 is a schematic diagram of a method for acquiring a first temperature change value according to an embodiment of the present invention.

In step S1061, a first temperature value collected by the infrared sensor 130 corresponding to the abnormal storage space for recent E times before the absolute value of the difference of the temperature values collected by the infrared sensor 130 at two adjacent times is greater than the sudden change value is recorded as a temperature value of the abnormal storage space before the article with the abnormal temperature is possibly placed in the abnormal storage space, wherein E≥2. For example, E may be 2, 3, 4, 5, or the like.

In step S1062, after the absolute value of the difference of the temperature values collected by the infrared sensor 130 corresponding to the abnormal storage space at two adjacent times is greater than the sudden change value, whether the absolute value of a difference of temperature values collected at any two adjacent times in the continuous M times is smaller than the first preset value is determined; and if yes, step S1063 is executed.

In step S1063, a second temperature value collected by the infrared sensor 130 corresponding to the abnormal storage space at any time in the continuous M times is recorded as a temperature value of the abnormal storage space after the article with the abnormal temperature is possibly placed in the abnormal storage space.

In step S1064, a difference between the second temperature value and the first temperature value is calculated, and is used as the first temperature change value.

In step S1063, M≥3 and the first preset value is smaller than or equal to the sudden change value. For example, M may be, 3, 4, 5, 6, or the like. The first preset value can be obtained experimentally. For a refrigerator, after an article with an abnormal temperature is placed in a certain storage space 140, the temperature in the abnormal storage space first rises at a high rate, and then rises steady. When the temperature in the abnormal storage space rises steady, the absolute value of the difference of the temperature values collected by the infrared sensor 130 corresponding to the abnormal storage space at two adjacent times in the continuous M times is smaller than the first preset value. Here, the temperature value collected at any one of the continuous M times may be used as the temperature of the abnormal storage space after the article with the abnormal temperature is possibly placed in the abnormal storage space. The first preset value may be set, for example, to 0.5° C., 0.4° C. or the like.

In a preferred embodiment, the second temperature value is a temperature value collected by the infrared sensor 130 corresponding to the abnormal storage space at the first or last time in the continuous M times. Therefore, in step S1063, the temperature value collected by the infrared sensor 130 corresponding to the abnormal storage space at the first or last time in the continuous M times is recorded as the temperature value of the abnormal storage space after the article with the abnormal temperature is possibly placed in the abnormal storage space.

In the embodiment shown in FIG. 4, a first temperature value collected by the infrared sensor 130 corresponding to the abnormal storage space for recent E times before the absolute value of the difference of the temperature values collected by the infrared sensor 130 at two adjacent times is greater than the sudden change value is recorded as a temperature value of the abnormal storage space before the article with the abnormal temperature is possibly placed in the abnormal storage space; and a second temperature value collected by the infrared sensor 130 corresponding to the abnormal storage space at any one of the continuous M times is recorded as a temperature value of the abnormal storage space after the article with the abnormal temperature is possibly placed in the abnormal storage space. If an absolute value of a difference of temperature values collected by the infrared sensor 130 corresponding to the abnormal storage space at the H-th time and the (H−1)-th time is greater than the sudden change value, the first temperature value is collected by the infrared sensor 130 at the (H−E)-th time, wherein H>E and E≥2. The first temperature value may be recorded as IR1 (H−E) or IR1 (1), wherein IR1 (H−E) represents the temperature value collected by the infrared sensor 130 corresponding to the abnormal storage space at the (H−E)-th time, and IR1 (1) represents the temperature value collected by the infrared sensor 130 corresponding to the abnormal storage space at the first time between time points before and after the article with the abnormal temperature is possibly placed in the abnormal storage space. It is assumed that the second temperature value is collected by the infrared sensor 130 corresponding to the abnormal storage space at the Q-th time, wherein Q>H. The second temperature value may be recorded as IR1(Q) or IR1(Q−H+E+1), wherein IR1(Q) represents the temperature value collected by the infrared sensor 130 corresponding to the abnormal storage space at the Q-th time, and IR1 (Q−H+E+1) represents the temperature value collected by the infrared sensor 130 corresponding to the abnormal storage space at the (Q−H+E+1)-th time or last time between time points before and after the article with the abnormal temperature is possibly placed in the abnormal storage space. It should be understood that "between time points before and after the article with the abnormal temperature is possibly placed in the abnormal storage space" refers to a time period from the beginning of the collection of the first temperature value by the infrared sensor 130 corresponding to the abnormal storage space to the end of the collection of the second temperature value by the infrared sensor 130 corresponding to the abnormal storage space, namely, a time period from the collection time point at the (H–E)-th time to the time collection time point at the Q-th time of the respective infrared sensors 130.

In step S106, there are multiple practicable processes of acquiring a second temperature change value. One preferred process includes: calculating, according to a temperature difference summation formula sum(n)=sum(n−1)+IR(n+1)−IR(n), the second temperature change value of the abnormal storage space caused by heat exchange between an external environment and the abnormal storage space between time points before and after the article with the abnormal temperature is possibly placed in the abnormal storage space, wherein at the start of the temperature difference summation calculation, sum(0)=0.

If an absolute value of a difference of temperature values collected by the infrared sensor 130 corresponding to the abnormal storage space at the (n+1)-th time and the n-th time between time points before and after the article with the abnormal temperature is possibly placed in the abnormal storage space is smaller than the first preset value, IR(n+1) and IR(n) are respectively the temperature values collected by the infrared sensor 130 corresponding to the abnormal storage space at the (n+1)-th time and the n-th time between time points before and after the article with the abnormal temperature is possibly placed in the abnormal storage space.

If the absolute value of the difference of the temperature values collected by the infrared sensor 130 corresponding to the abnormal storage space at the (n+1)-th time and the n-th time between time points before and after the article with the abnormal temperature is possibly placed in the abnormal storage space is greater than or equal to the first preset value, and there is one additional infrared sensor 130 by which an absolute value of a difference of temperature values collected at the (n+1)-th time and the n-th time between time points before and after the article with the abnormal temperature is possibly placed in the abnormal storage space is smaller than the first preset value, IR(n+1) and IR(n) are respectively temperature values collected by the additional infrared sensor at the (n+1)-th time and the n-th time between time points before and after the article with the abnormal temperature is possibly placed in the abnormal storage space. If there are two or more additional infrared sensors, IR(n+1) and IR(n) are respectively temperature values collected by any one of the additional infrared sensors at the (n+1)-th time and the n-th time between time points before and after the article with the abnormal temperature is possibly placed in the abnormal storage space, or are respectively average values of temperature values collected by the all additional infrared sensors at the (n+1)-th time and the n-th time between time points before and after the article with the abnormal temperature is possibly placed in the abnormal storage space.

If an absolute value of a difference of temperature values collected by each of the infrared sensors 130 at the (n+1)-th time and the n-th time between time points before and after the article with the abnormal temperature is possibly placed in the abnormal storage space is greater than or equal to the first preset value, sum(n)=sum(n−1).

That is, before using the temperature difference summation formula sum(n)=sum(n−1)+IR(n+1)−IR(n) to calculate temperature difference summation every time, it is required to compare an absolute value of a difference of the temperature values collected by the infrared sensor 130 corresponding to the abnormal storage space at two adjacent times with the first preset value. If the absolute value of the difference of the temperature values collected by the infrared sensor 130 corresponding to the abnormal storage space at two adjacent times is smaller than the first preset value, this temperature difference summation is calculated by using the temperature values collected by the infrared sensor corresponding to the abnormal storage space at two adjacent times; otherwise, an absolute value of a difference of the temperature values collected by each of remaining infrared sensors at two adjacent times is compared with the first preset value. Then, according to the comparation result, the temperature difference summation of current time is either calculated by using the temperature values collected by the additional infrared sensor which meets the condition (the comparation result is that there is an additional infrared sensor by which the absolute value of the difference of the temperature values collected at two adjacent times is smaller than the first preset value) at two adjacent times, or equal to the previous temperature difference summation (the comparation result is that the absolute value of the difference of the temperature values collected by any one of the infrared sensors at two adjacent times is greater than or equal to the first preset value).

Figure 5:
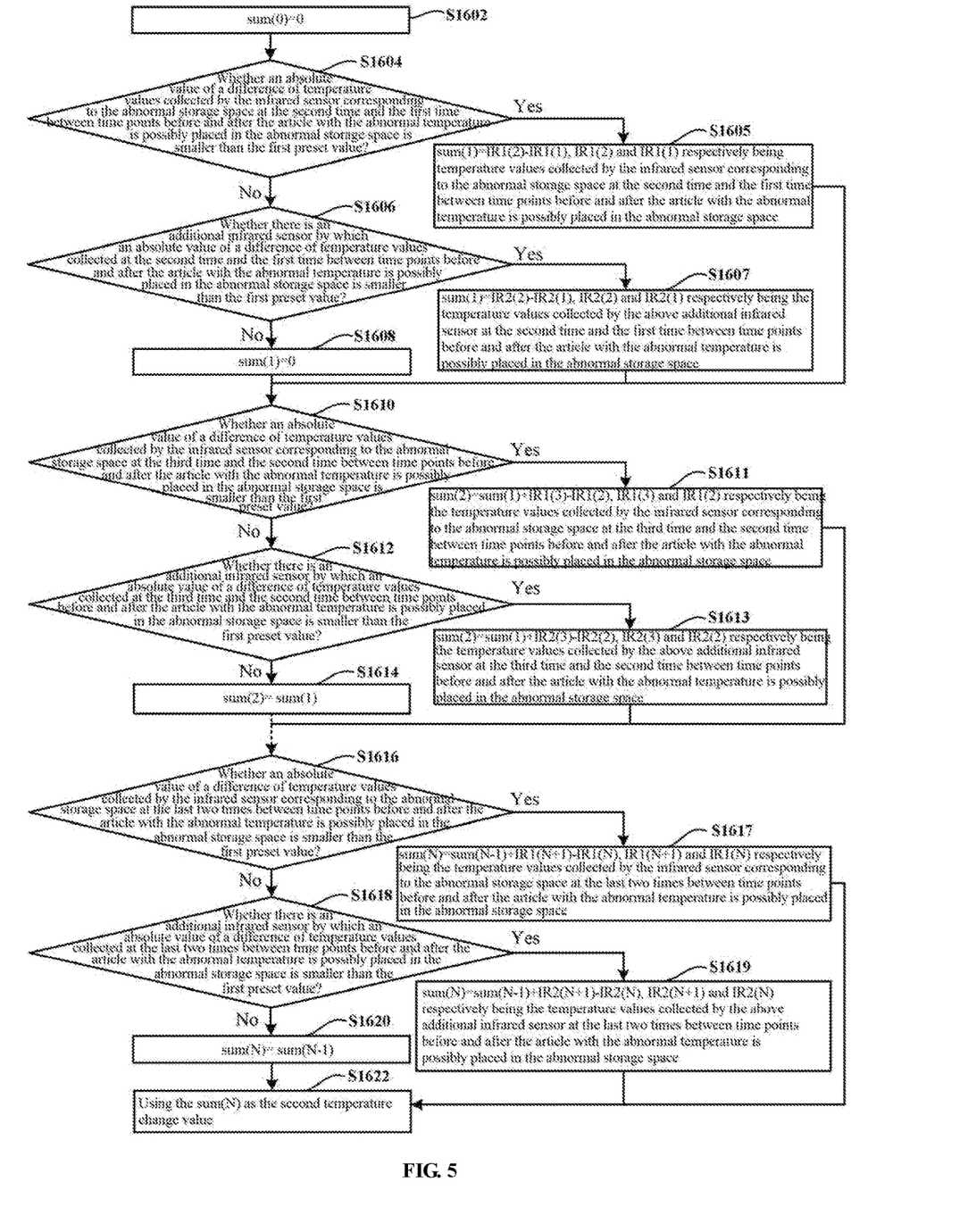
FIG. 5 is a schematic diagram of a method for acquiring a second temperature change value according to an embodiment of the present invention.

A preferred process of acquiring the second temperature change value is described herein by specifically referring to step S1602 to step S1622 shown in FIG. 5.

In step S1602, at the start of the temperature difference summation calculation, sum(0)=0.

In step S1604, whether an absolute value of a difference of temperature values collected by the infrared sensor 130 corresponding to the abnormal storage space at the second time and the first time between time points before and after the article with the abnormal temperature is possibly placed in the abnormal storage space is smaller than the first preset value is determined. If yes, S1605 is executed; or if not, S1606 is executed.

In step S1605, sum(1)=IR1(2)−IR1(1), wherein IR1(2) and IR1(1) are respectively the temperature values collected by the infrared sensor 130 corresponding to the abnormal storage space at the second time and the first time between time points before and after the article with the abnormal temperature is possibly placed in the abnormal storage space, and sum(1) is a result of the temperature difference summation calculated at the first time.

In step S1606, whether there is an additional infrared sensor by which an absolute value of a difference of temperature values collected at the second time and the first time between time points before and after the article with the abnormal temperature is possibly placed in the abnormal storage space is smaller than the first preset value is determined. If yes, S1607 is executed; or if not, S1608 is executed.

In step S1607, sum(1)=IR2(2)−IR2(1), wherein IR2(2) and IR2(1) are respectively the temperature values collected by the above additional infrared sensor at the second time and the first time between time points before and after the article with the abnormal temperature is possibly placed in the abnormal storage space. Specifically, when there is one additional infrared sensor, IR2(2) and IR2(1) are respectively the temperature values collected by the above additional infrared sensor at the second time and the first time between time points before and after the article with the abnormal temperature is possibly placed in the abnormal storage space. When there are two or more additional infrared sensors, IR2(2) and IR2(1) are respectively the temperature values collected by any of the additional infrared sensors at the second time and the first time between time points before and after the article with the abnormal temperature is possibly placed in the abnormal storage space; or IR2(2) is the average value of the temperature values collected by the all additional infrared sensors at the second time between time points before and after the article with the abnormal temperature is possibly placed in the abnormal storage space, and IR2(1) is the average value of the temperature values collected by the all additional infrared sensors at the first time between time points before and after the article with the abnormal temperature is possibly placed in the abnormal storage space.

In step S1608, sum(1)=0.

In step S1610, whether an absolute value of a difference of temperature values collected by the infrared sensor 130 corresponding to the abnormal storage space at the third time and the second time between time points before and after the article with the abnormal temperature is possibly placed in the abnormal storage space is smaller than the first preset value is determined. If yes, S1611 is executed; or if not, S1612 is executed.

In step S1611, sum(2)=sum(1)+IR1(3)−IR1(2), wherein IR1(3) and IR1(2) are respectively the temperature values collected by the infrared sensor corresponding to the abnormal storage space at the third time and the second time between time points before and after the article with the abnormal temperature is possibly placed in the abnormal storage space, and sum(2) is a result of the temperature difference summation calculated at the second time.

In step S1612, whether there is an additional infrared sensor by which an absolute value of a difference of temperature values collected at the third time and the second time between time points before and after the article with the abnormal temperature is possibly placed in the abnormal storage space is smaller than the first preset value is determined. If yes, S1613 is executed; or if not, S1614 is executed.

In step S1613, sum(2)=sum(1)+IR2(3)−IR2(2), wherein IR2(3) and IR2(2) are respectively the temperature values (average values of the temperature values) collected by the above additional infrared sensor at the third time and the second time between time points before and after the article with the abnormal temperature is possibly placed in the abnormal storage space. For details, please refer to step S1607.

In step S1614, sum(2)=sum(1).

By this way, until in step S1616, whether an absolute value of a difference of temperature values collected by the infrared sensor 130 corresponding to the abnormal storage space at the last two times between time points before and after the article with the abnormal temperature is possibly placed in the abnormal storage space is smaller than the first preset value is determined. If yes, S1617 is executed; or if not, S1618 is executed.

In step S1617, sum(N)=sum(N−1)+IR1(N+1)−IR1(N), wherein IR1(N+1) and IR1(N) are respectively the temperature values collected by the infrared sensor corresponding to the abnormal storage space at the last two times between time points before and after the article with the abnormal temperature is possibly placed in the abnormal storage space, and sum(N) and sum(N−1) are respectively results of the temperature difference summation calculated at the last two times.

In step S1618, whether there is an additional infrared sensor by which an absolute value of a difference of temperature values collected at the last two times between time points before and after the article with the abnormal temperature is possibly placed in the abnormal storage space is smaller than the first preset value is determined. If yes, S1619 is executed; or if not, S1620 is executed.

In step S1619, sum(N)=sum(N−1)+IR2(N+1)−IR2(N), wherein IR2(N+1) and IR2(N) are respectively the temperature values (average values of the temperature values) collected by the above additional infrared sensor at the last two times between time points before and after the article with the abnormal temperature is possibly placed in the abnormal storage space. For details, please refer to step S1607.

In step S1620, sum(N)=sum(N−1).

In step S1622, sum(N) is a second temperature change value.

Steps S1604 to S1608 describe the process of the first temperature difference summation calculation. The first temperature difference summation calculation starts from the collection of the first temperature value by the infrared sensor 130 corresponding to the abnormal storage space. As described above, the infrared sensor 130 corresponding to the abnormal storage space collects the first temperature value at the time point of the (H−E)-th collection. That is, the (H−E)-th collection of the infrared sensor 130 corresponding to the abnormal storage space corresponds to the first collection of each infrared sensor performed between time points before and after the article with the abnormal temperature is possibly placed in the abnormal storage space. Prior to the first temperature difference summation calculation, whether an absolute value of a difference of temperature values collected by the infrared sensor 130 corresponding to the abnormal storage space at the (H−E+1)-th time and the (H−E)-th time is smaller than the first preset value is determined (namely, step S1604). If yes, sum(1)=IR1(2)−IR1(1), wherein IR1(2) and IR1(1) (which may also be represented by IR1 (H−E+1) and IR1 (H−E) respectively) are respectively temperature values collected by the infrared sensor 130 corresponding to the abnormal storage space at the (H−E+1)-th time and the (H−E)-th time (namely, step S1605). If the absolute value of the difference of the temperature values collected by the infrared sensor 130 corresponding to the abnormal storage space at the (H−E+1)-th time and the (H−E)-th time is greater than or equal to the first preset value, whether there is an additional infrared sensor by which an absolute value of a difference of temperature values collected at the (H−E+1)-th time and the (H−E)-th time is smaller than the first preset value is determined (namely, step S1606). If there is only one additional infrared sensor, sum(1)=IR2(2)−IR2(1), wherein IR2(2) and IR2(1) (which may also be represented by IR2(H−E+1) and IR2(H−E) respectively) are respectively temperature values collected by the additional infrared sensor 130 at the (H−E+1)-th time and the (H−E)-th time. If there are two or more additional infrared sensors, sum(1)=IR2'(2)−IR2'(1), wherein IR2'(2) and IR2'(1) (which may also be represented by IR2'(H−E+1) and IR2'(H−E) respectively) are respectively temperature values collected by any one of the additional infrared sensors at the (H−E+1)-th time and the (H−E)-th time; or sum(1)=[$IR2_1(2)-IR2_1(1)+IR2_2(2)-IR2_2(1)+\ldots$]/2, wherein $IR2_1(2)$ and $IR2_2(2)$ (which may be represented by $IR2_1$ (H−E+1) and $IR2_2$(H−E+1) respectively) and the like are respectively the temperature values collected by each of the additional infrared sensors at the (H−E+1)-th time, and $IR2_1(1)$ and $IR2_2(1)$ (which may be represented by $IR2_1$ (H−E) and $IR2_2$(H−E) respectively) and the like are respectively the temperature values collected by each of the additional infrared sensors at the (H−E)-th time (namely, step S1607). If an absolute value of a difference of temperature values collected by each of the infrared sensors at the (H−E+1)-th time and the (H−E)-th time is greater than or equal to the first preset value, sum(1)=0 (namely, step S1608).

Steps S1610 to S1614 describe the process of the second temperature difference summation calculation. Similar to the first temperature difference summation, prior to the second temperature difference summation calculation, whether an absolute value of a difference of temperature values collected by the infrared sensor 130 corresponding to the abnormal storage space at the (H−E+2)-th time and the (H−E+1)-th time is smaller than the first preset value is determined (namely, step S1610). If yes, sum(2)=sum(1)+IR1(3)−IR1(2), wherein IR1(3) and IR1(2) (IR1(3) may also be represented by IR1 (H−E+2)) are respectively temperature values collected by the infrared sensor 130 corresponding to the abnormal storage space at the (H−E+2)-th time and the (H−E+1)-th time (namely, step S1611). Or, if not, whether there is an additional infrared sensor by which an absolute value of a difference of temperature values collected at the (H−E+2)-th time and the (H−E+1)-th time is smaller than the first preset value is determined (namely, step S1612).

Steps S1616 to S1620 describe the process of the last temperature difference summation calculation. The temperature difference summation calculation ends when the infrared sensor 130 corresponding to the abnormal storage space collects the second temperature value. As described above, the infrared sensor 130 corresponding to the abnormal storage space collects the second temperature value at the time point of the Q-th collection. That is, the Q-th collection of the infrared sensor 130 corresponding to the abnormal storage space corresponds to the last collection of each infrared sensor between time points before and after the article with the abnormal temperature is possibly placed in the abnormal storage space. Prior to the last temperature difference summation calculation (namely, the (Q−H+E)-th temperature difference summation calculation), whether an absolute value of a difference of temperature values collected by the infrared sensor 130 corresponding to the abnormal storage space at the Q-th time and the (Q−1)-th time is smaller than the first preset value is determined (namely, step S1616). If yes, sum(Q−H+E)=sum(Q−H+E−1)+IR1(Q−H+E+1)−IR1(Q−H+E), wherein IR1(Q−H+E−1) and IR1(Q−H+E) (which may also be represented by IR1(Q) and IR1(Q−1)) are respectively temperature values collected by the infrared sensor 130 corresponding to the abnormal storage space at the Q-th time and the (Q−1)-th time (namely, step S1617, and sum(Q−H+E) being sum(N)). Or, if not, whether there is an additional infrared sensor by which an absolute value of a difference of temperature values collected at the Q-th time and the (Q−1)-th time is smaller than the first preset value is determined (namely, step S1618).

Sum(Q−H+E) is the second temperature change value caused by heat exchange between the external environment and the abnormal storage space between time points before and after the article with the abnormal temperature is possibly placed in the abnormal storage space.

In step S108, there are multiple practicable processes of determining whether the article with the abnormal temperature is placed in the abnormal storage space according to the first temperature change value and the second temperature change value. One preferred process is described herein by referring to steps S1081 to S1083 shown in FIG. 6.

Figure 6:
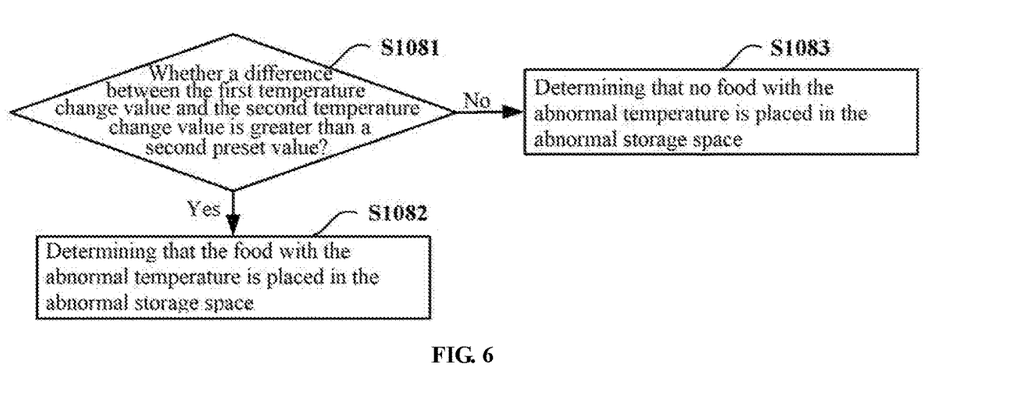
FIG. 6 is a schematic diagram of a method for determining whether food with an abnormal temperature is placed in an abnormal storage space according to an embodiment of the present invention.

In step S1081, whether a difference between the first temperature change value and the second temperature change value is greater than a second preset value is determined. If yes, step S1082 is executed; or if not, step S1083 is executed.

In step S1082, it is determined that the article with the abnormal temperature is placed in the abnormal storage space.

In step S1083, it is determined that no article with the abnormal temperature is placed in the abnormal storage space.

In step S1081, the second preset value may be greater than or equal to the sudden change value. The second preset value is related to the lowest temperature of the article with the abnormal temperature identified by the refrigerator. For example, if the refrigerator considers that the article with a temperature higher than 40° C. is an abnormal article, the second preset value is determined experimentally when the article with the temperature of higher than 40° C. is placed in a certain storage space 140.

After step S1082, a visual and/or audible signal is sent to remind a user that the article placed in the storage space 140 thereby has an abnormal temperature. For example, the user may be reminded through a specific music or ringtone or voice prompt sent by a built-in sounding device in the refrigerator, or a text reminder displayed on a displaying device on the door body of the refrigerator, or a lighting or flashing indicator light.

After step S1082 or step S1083, a plurality of infrared sensors 130 may continue to collect temperature values, and steps S104 to S108 are executed again.

In addition, in some embodiments, if the temperature collected by an infrared sensor 130 corresponding to another storage space 140 also suddenly changes between time points before and after the article with the abnormal temperature is possibly placed in the abnormal storage space, first, whether the article with the abnormal temperature is placed in the abnormal storage space is determined; and then, whether food with an abnormal temperature is placed in the storage space 140 that corresponds to the infrared sensor 130 by which the collected temperature changes suddenly is determined. For the process of determining whether the food with the abnormal temperature is placed in the storage space 140 that corresponds to the infrared sensor 130 by which the collected temperature changes suddenly, please refer to steps S106 to S108.

Figure 7:
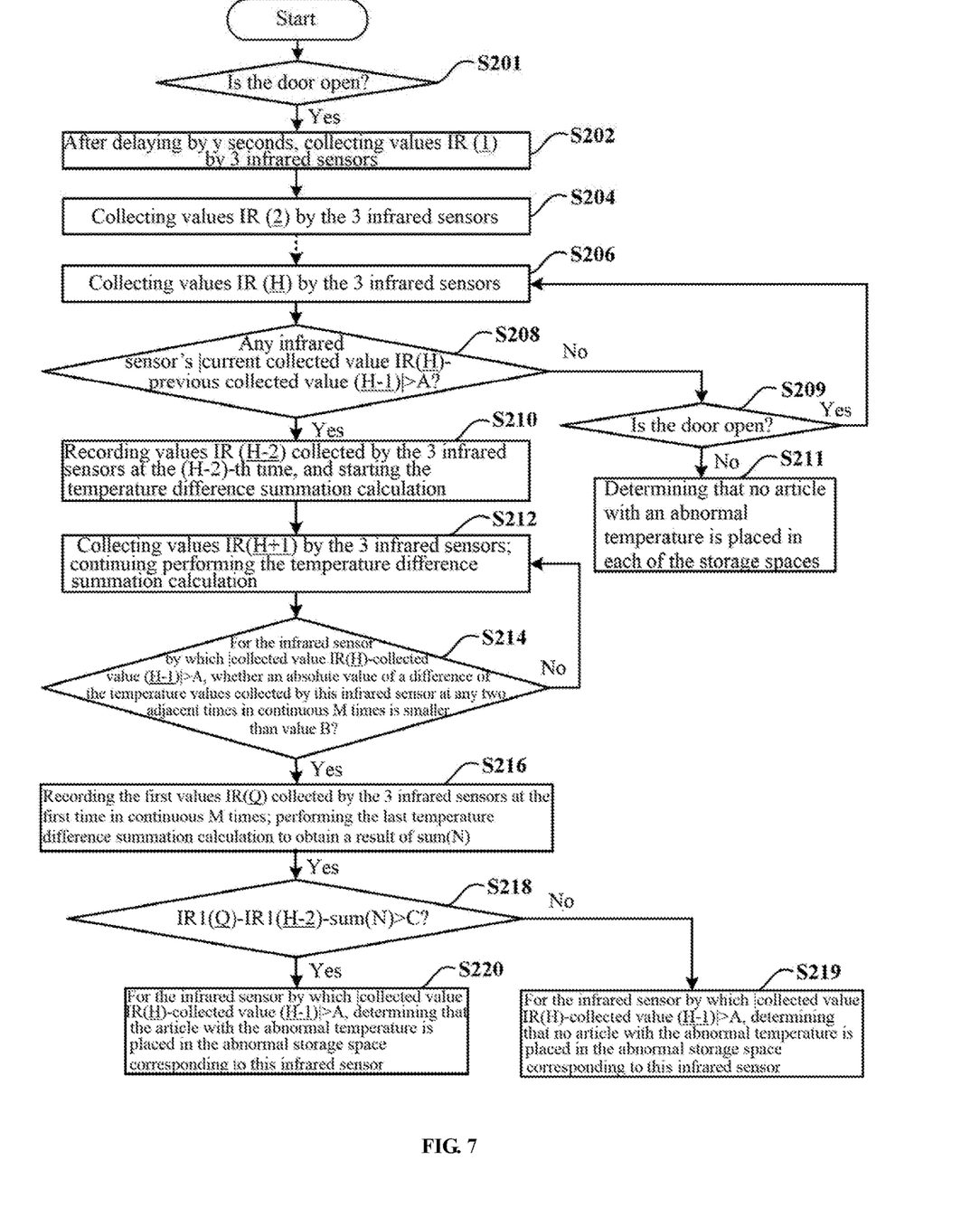
FIG. 7 is a detailed flow chart of the method for detecting whether the article with the abnormal temperature is placed in the refrigerator according to the embodiment of the present invention.

FIG. 7 is a detailed flow chart of the method for detecting whether the article with the abnormal temperature is placed in the refrigerator according to the embodiment of the present invention. There are three infrared sensors 130 configured to collect temperatures of three storage spaces 140 respectively.

In step S201, whether a door body is opened is determined; and if yes, step S202 is executed.

In step S202, after delaying by y seconds, the three infrared sensors 130 start to collect temperature values IR(1), and record collection times. For example, y is 2 to 3 seconds.

In step S204, the three infrared sensors 130 collect temperature values IR(2) at the second time, and record collection times.

In step S206, the three infrared sensors 130 collect the temperature values IR(H) at the H-th time, and record collection times.

In step S208, whether an absolute value of a difference between a temperature value IR(H) and a temperature value IR(H−1) collected by any one of the infrared sensors 130 currently and previously is greater than the sudden change value A is determined, if yes, it is determined that the temperature value collected by the infrared sensor 130 is changed suddenly, step S210 is executed; or if not, it is determined that the temperature values collected by the three infrared sensors 130 are not changed suddenly, step S209 is executed. In the present invention, if it is determined that the temperature value collected by one of infrared sensors 130 is changed suddenly, it means that an article with an abnormal temperature is possibly placed in the storage space 140 corresponding to this infrared sensor 130, resulting in the sudden change of the temperature of the storage space 140. The infrared sensor 130 by which the collected temperature value is changed suddenly in step S208 is recorded as a first infrared sensor, and the other two infrared sensors 130 are recorded as a second infrared sensor and a third infrared sensor. Temperature values IR (H−2) collected twice by the three infrared sensors 130 before the temperature value collected by the first infrared sensor is changed suddenly. The temperature value collected by the first infrared sensor at the (H−2)-th time can be represented by IR1 (H−2).

In step S209, whether the door body is in an open state is determined. If yes, the process returns to step S206, the three infrared sensors 130 continue to collect the temperature values, and whether an absolute value of a difference between a temperature value IR(H) and a temperature value IR(H−1) collected by any one of the infrared sensors 130 currently and previously is greater than the sudden change value A is determined; and if not, step S211 is executed.

In step S210, the temperature values IR (H−2) collected by the three infrared sensors 130 at the (H−2)-th time are recorded, and the temperature difference summation calculation is started, wherein sum(1)=IR(H−1)−IR(H−2), and sum(2)=sum(1)+IR(H)−IR(H−1). The first temperature value may be represented by IR1 (H−2), and is the temperature value collected by the first infrared sensor for the recent two times before an absolute value of a difference of the temperature values collected by the first infrared sensor at two adjacent times is greater than the sudden change value (namely, E=2).

In step S211, it is determined that no article with an abnormal temperature is placed in each of the storage spaces 140.

In step S212, the three infrared sensors 130 continue to collect the temperature values IR(H+1), and temperature difference summation calculation is executed continuously.

In step S214, whether an absolute value of a difference of the temperature values collected by the infrared sensor 130 (namely, the first infrared sensor) at any two adjacent times in continuous M times is smaller than the first preset value B is determined after it is determined that an absolute value of a difference between the temperature value IR(H) and the temperature value IR(H−1) collected by the infrared sensor 130 is greater than the sudden change value A; and if yes, step S216 is executed.

In step S216, the values IR(Q) collected by the three infrared sensors 130 at the first time in continuous M times are recorded; and the last temperature difference summation calculation is executed. Q can represent the number of times that the first infrared sensor collects the second temperature value (namely, the temperature value collected by the first infrared sensor at the first time in continuous M times); the second temperature value is represented by IR1 (Q); and sum(N) represents a result of the last temperature difference summation calculation.

In step S218, whether IR1(Q)−IR1(H−2)−sum(N) is greater than the second preset value C is determined. If yes, step S220 is executed; or if not, step S219 is executed. In step S218, a difference between the temperature of the abnormal storage space which tends to be stable and which is collected by the first infrared sensor after the article with the abnormal temperature is possibly placed in the abnormal storage space and the temperature of the abnormal storage space before the article with the abnormal temperature is placed in the abnormal storage space is compared with sum(N). If the difference is greater than the second preset value, step S220 is executed, and it is determined that the article with the abnormal temperature is placed in the abnormal storage space corresponding to the first infrared sensor. If the difference is smaller than or equal to the second preset value, step S219 is executed, and it is determined that no article with the abnormal temperature is placed in the abnormal storage space corresponding to the first infrared sensor.

After step S220 and step S219, the process may return to step S201.

In some embodiments, after step S220, a reminder may be sent by, such as lighting an indicator light corresponding to the abnormal storage space to remind the user that the article with the abnormal temperature is placed in the storage space 140.

In other embodiments, the determination result of step S218 may be sent to a main control board of the refrigerator to participate in the control of a refrigeration system of the refrigerator. For example, when the determination result shows that the article with the abnormal temperature is placed in a certain storage space 140, the refrigeration system provides more refrigeration energy to the storage space 140 to reduce its temperature to a preset storage temperature as soon as possible. By using the method for detecting whether the article with the abnormal temperature is placed in the refrigerator according to the present embodiment, refrigeration control can be realized timely and effectively, and the adverse influence of an article with a high temperature on the surrounding storage space 140 is avoided, so that a storage effect of the refrigerating chamber of the refrigerator is improved, the nutrient loss of food is reduced, and meanwhile, waste of electric energy caused by the refrigeration of the whole storage compartment in the same way is prevented.

In addition, in some embodiments, after whether the article with the abnormal temperature is placed in the storage space 140 corresponding to the first infrared sensor is determined, whether the temperature values collected by the second and third infrared sensors are changed suddenly can be determined by using step S208, so as to determine whether the article with the abnormal temperature is placed in the storage space 140 corresponding to each of the second and third infrared sensors. Here, for the specific process, please refer to step S210 to step S219 or step S210 to step S220.

In an illustrative embodiment, there are three infrared sensors 130, namely, a first infrared sensor, a second infrared sensor, and a third infrared sensor which are configured to collect temperatures of three storage spaces 140. The temperature of each of the storage spaces 140 is set to 5° C. The above sudden change value is set to 0.6° C., the first preset value to 0.4° C., and the second preset value to 0.8° C.; and E=2, and M=4.

After the door is opened, the three infrared sensors 130 start to collect temperature values after two seconds. The temperature value collected by the first infrared sensor at the first time is 5.1° C., at the second time is 5.2° C., at the third time is 5.4° C., at the fourth time is 5.6° C., at the fifth time is 5.9° C., at the sixth time is 6.2° C., at the seventh time is 6.9° C., at the eighth time is 7.6° C., at the ninth time is 8.2° C., at the tenth time is 8.8° C., at the eleventh time is 9.3° C., at the twelfth time is 9.6° C., at the thirteenth time is 9.9° C., at the fourteenth time is 10.2° C., at the fifteenth time is 10.4° C., and so on.

The temperature value collected by the second infrared sensor at the first time is 5.2° C., at the second time is 5.3° C., at the third time is 5.5° C., at the fourth time is 5.7° C., at the fifth time is 5.9° C., at the sixth time is 6.2° C., at the seventh time is 6.4° C., at the eighth time is 6.6° C., at the ninth time is 6.8° C., at the tenth time is 7.1° C., at the eleventh time is 7.3° C., at the twelfth time is 7.6° C., at the thirteenth time is 7.9° C., at the fourteenth time is 8.2° C., at the fifteenth time is 8.4° C., and so on.

The temperature value collected by the third infrared sensor at the first time is 5.1° C., at the second time is 5.3° C., at the third time is 5.4° C., at the fourth time is 5.6° C., at the fifth time is 5.9° C., at the sixth time is 6.1° C., at the seventh time is 6.4° C., at the eighth time is 6.6° C., at the ninth time is 6.9° C., at the tenth time is 7.1° C., at the eleventh time is 7.4° C., at the twelfth time is 7.7° C., at the thirteenth time is 7.9° C., at the fourteenth time is 8.1° C., at the fifteenth time is 8.3° C., and so on.

According to the above collection results, it can be known that when the first infrared sensor collects the temperature value at the seventh time, the absolute value of the difference of the temperature values collected by the first infrared sensor at two adjacent times is greater than the sudden change value (i.e., |6.9° C.−6.2° C.|>0.6° C., H=7). The storage space 140 corresponding to the first infrared sensor is an abnormal storage space. That is, an article with an abnormal temperature is possibly placed in the storage space 140. The temperature value collected at the fifth time (i.e., H−E=7−2) is recorded as the first temperature value. When the first infrared sensor collects the temperature value at the twelfth time, the absolute value of the difference of the temperature values collected by the first infrared sensor at two adjacent times is smaller than the first preset value (i.e., the absolute value of the difference of the temperature values collected at twelfth time and eleventh time is smaller than 0.4° C.,|9.6° C.−9.3° C.|<0.4° C., Q=12); and till the first infrared sensor collects the temperature value at the fifteenth time, the absolute value of the difference of the temperature values collected by the first infrared sensor at any two adjacent times in the continuous four times is smaller than the first preset value, and the temperature value collected by the first infrared sensor at the first time (at the twelfth time) in the continuous four times is recorded as the second temperature value. Accordingly, the first temperature change value=the second temperature value−the first temperature value=9.6° C.−5.9° C.=3.7° C.

In the first temperature difference summation calculation, the difference of the temperature values collected by the first infrared sensor at the sixth and fifth times is 0.3 which is smaller than 0.4° C., so that sum(1)=IR1(2)−IR1(1)=0.3° C., wherein IR1(2) and IR1(1) are respectively the temperature values collected by the first infrared sensor at the sixth and fifth times.

In the second temperature difference summation calculation, the difference of the temperature values collected by the first infrared sensor at the seventh and sixth times is 0.7 which is greater than 0.4° C., the difference of the temperature values collected by the second infrared sensor at the seventh and sixth times is 0.2 which is smaller than 0.4° C., and the difference of the temperature values collected by the third infrared sensor at the seventh and sixth times is 0.3 which is smaller than 0.4° C., so that sum(2)=sum(1)+(IR2(3)−IR2(2)+IR3(3)−IR3(2))/2=0.55° C., wherein IR2(3) and IR2(2) are respectively the temperature values collected by the second infrared sensor at the seventh and sixth times; and IR3(3) and IR3(2)) are respectively the temperature values collected by the third infrared sensor at the seventh and sixth times.

By this way, in the last (namely, seventh) temperature difference summation calculation, the difference of the temperature values collected by the first infrared sensor at the twelfth and eleventh times is 0.3 which is smaller than 0.4° C., so that sum(7)=sum(6)+IR1(8)−IR1(7)=1.8° C., wherein IR1(8) and IR1(7) are respectively the temperature values collected by the first infrared sensor at the twelfth and eleventh times.

That is, the second temperature change value=sum(7)=1.8° C., so that the difference between the first temperature change value and the second temperature change value=3.7° C.−1.8° C.=1.9° C. which is greater than the second preset value of 0.8° C., therefore it is determined that the article with the abnormal temperature is placed in the abnormal storage space corresponding to the first infrared sensor.

During the first to fifteenth collections of the second infrared sensor and the third infrared sensor, none of the absolute value of the difference of the temperature values collected at two adjacent times is greater than the first preset value. Therefore, during the first to fifteenth collections of the infrared sensors, no article with the abnormal temperature is placed in the storage space corresponding to each of the second infrared sensor and the third infrared sensor.

Although multiple embodiments of the present invention have been illustrated and described in detail, those skilled in the art may make various modifications and variations to the present invention based on the content disclosed by the present invention or the content derived therefrom without departing from the spirit and scope of the present invention. Thus, the scope of the present invention should be understood and deemed to include these and other modifications and variations.

What is claimed is:

1. A method for detecting whether an article with an abnormal temperature is placed in a refrigerator, wherein the refrigerator comprises a refrigerator body whose inner portion is divided into a plurality of storage spaces, a door body arranged at a front of the refrigerator body, a controller disposed on a main control board installed in the refrigerator body, and a plurality of infrared sensors configured to sense temperatures of the plurality of storage spaces and electrically connected to the controller respectively; and the method performed by the controller comprises:

controlling the plurality of infrared sensors to collect temperature values after the door body is opened;

determining whether an abnormal storage space in which the article with the abnormal temperature is placed exists in the plurality of storage spaces;

acquiring a first temperature change value of the abnormal storage space before and after the article with the abnormal temperature is placed in the abnormal storage space in response to a result that the abnormal storage space exists being determined;

calculating a second temperature change value of the abnormal storage space according to a temperature difference summation formula sum(n)=sum(n−1)+IR(n+1)−IR(n), wherein the second temperature change value is caused by heat exchange between an external environment and the abnormal storage space between time points before and after the article with the abnormal temperature is placed in the abnormal storage space, wherein at the start of the temperature difference summation calculation, sum(0)=0;

setting IR(n+1) and IR(n) respectively being temperature values collected by the infrared sensor corresponding to the abnormal storage space at an (n+1)-th time and an n-th time between time points before and after the article with the abnormal temperature is placed in the abnormal storage space in response to an absolute value of a difference of the temperature values collected by an infrared sensor corresponding to the abnormal storage space at the (n+1)-th time and the n-th time between time points before and after the article with the abnormal temperature is placed in the abnormal storage space being smaller than a first preset value;

setting IR(n+1) and IR(n) respectively being temperature values collected by an additional infrared sensor at the (n+1)-th time and the n-th time between time points before and after the article with the abnormal temperature is placed in the abnormal storage space in response to the absolute value of the difference of the temperature values collected by the infrared sensor corresponding to the abnormal storage space at the (n+1)-th time and the n-th time between time points before and after the article with the abnormal temperature is placed in the abnormal storage space being greater than or equal to the first preset value, and the additional infrared sensor by which an absolute value of a difference of temperature values collected at the (n+1)-th time and the n-th time between time points before and after the article with the abnormal temperature is placed in the abnormal storage space is smaller than the first preset value being identified;

setting IR(n+1) and IR(n) respectively being temperature values collected by any one of two or more additional infrared sensors at the (n+1)-th time and the n-th time between time points before and after the article with the abnormal temperature is placed in the abnormal storage space, or respectively being average values of temperature values collected by all of the two or more additional infrared sensors at the (n+1)-th time and the n-th time between time points before and after the article with the abnormal temperature is placed in the abnormal storage space in response to the absolute value of the difference of the temperature values collected by the infrared sensor corresponding to the abnormal storage space at the (n+1)-th time and the n-th time between time points before and after the article with the abnormal temperature is placed in the abnormal storage space being greater than or equal to the first preset value, and the two or more additional infrared sensors by each of which an absolute value of a difference of temperature values collected at the (n+1)-th time and the n-th time between time points before and after the article with the abnormal temperature is placed in the abnormal storage space is smaller than the first preset value being identified;

setting sum(n)=sum(n−1) in response to an absolute value of a difference of temperature values collected by each of the plurality of infrared sensors at the (n+1)-th time and the n-th time between time points before and after the article with the abnormal temperature is placed in the abnormal storage space being greater than or equal to the first preset value; and determining whether the article with the abnormal temperature is placed in the abnormal storage space according to the first temperature change value and the second temperature change value.

2. The method of claim 1, wherein determining whether the abnormal storage space exists in the plurality of storage spaces comprises:

determining that the abnormal storage space exists in the plurality of storage spaces, and determining that each storage space corresponding to any one of the plurality of infrared sensors by which an absolute value of a difference of temperature values collected at two adjacent times is greater than a preset sudden change value is the abnormal storage space during opening of the door body in response to the absolute value of the difference of the temperature values collected by the any one of the plurality of infrared sensors at two adjacent times being greater than the sudden change value; and determining that the abnormal storage space does not exist in the plurality of storage spaces during opening of the door body in response to an absolute value of a difference of temperature values collected by each of the plurality of infrared sensors at two adjacent times being smaller than or equal to the sudden change value, wherein the sudden change value is greater than or equal to the first preset value.

3. The method of claim 2, wherein acquiring the first temperature change value comprises:

recording a first temperature value collected by the infrared sensor corresponding to the abnormal storage space for recent E times before the absolute value of the difference of the temperature values collected by the infrared sensor at two adjacent times is greater than the sudden change value, and using the first temperature value as a temperature value of the abnormal storage space before the article with the abnormal temperature is placed in the abnormal storage space, wherein E≥2;

recording a second temperature value collected by the infrared sensor corresponding to the abnormal storage space at any one of continuous M times after the absolute value of the difference of the temperature values collected by the infrared sensor corresponding to the abnormal temperature space at two adjacent times is greater than the sudden change value and the absolute value of the difference of the temperature values collected at any two adjacent times in the continuous M times is smaller than the first preset value, and using the second temperature value as a temperature value of the abnormal storage space after the article with the abnormal temperature is placed in the abnormal storage space, wherein M≥3; and calculating a difference between the second temperature value and the first temperature value, and using the difference as the first temperature change value.

4. The method of claim 3, wherein:

recording the temperature value collected by the infrared sensor corresponding to the abnormal storage space at the first or last time in the continuous M times, and using the temperature value as a temperature value of the abnormal storage space after the article with the abnormal temperature is placed in the abnormal storage space.

5. The method of claim 3, wherein:

performing temperature collection by each of the plurality of infrared sensors for the first time between time points before and after the article with the abnormal temperature is placed in the abnormal storage space in response to the infrared sensor corresponding to the abnormal storage space collecting the recorded first temperature value;

performing temperature collection by each of the plurality of infrared sensors for the last time between time points before and after the article with the abnormal temperature is placed in the abnormal storage space in response to the infrared sensor corresponding to the abnormal storage space collecting the recorded second temperature value;

performing temperature difference summation calculation for the first time by using temperature values collected by the infrared sensor at the second and first times between time points before and after the article with the abnormal temperature is placed in the abnormal storage space;

performing temperature difference summation calculation for the last time by using temperature values collected by the infrared sensor at the last two times between time points before and after the article with the abnormal temperature is placed in the abnormal storage space; and using a result of the last temperature difference summation calculation as the second temperature change value.

6. The method of claim 2, wherein determining whether the article with the abnormal temperature is placed in the abnormal storage space according to the first temperature change value and the second temperature change value comprises:

determining whether a difference between the first temperature change value and the second temperature change value is greater than a second preset value;

determining that the article with the abnormal temperature is placed in the abnormal storage space in response to the difference being greater than the second preset value;

determining that no article with the abnormal temperature is placed in the abnormal storage space in response to the difference being not greater than a second preset value;

wherein the second preset value is greater than or equal to the sudden change value.

7. The method of claim 1, wherein a number of the plurality of infrared sensors is three or more.

8. The method of claim 1, wherein controlling the plurality of infrared sensors to collect the temperature values is performed after the door body is opened for a preset period.

9. The method of claim 1, further comprising:

sending a visual and/or audible signal to remind a user in response to a result that the article with the abnormal temperature is placed in the abnormal storage space being determined; and determining that no article with the abnormal temperature is placed in any of the plurality of storage spaces during opening of the door body in response to a result that the abnormal storage space does not exist being determined.

* * * * *